United States Patent [19]

Wallin

[11] 4,101,094
[45] Jul. 18, 1978

[54] DEVICE FOR USE IN EMERGENCY LOCKING MECHANISM FOR WEBBING-TYPE SAFETY BELTS

[75] Inventor: Jan-Olof Wallin, Ellerau, Fed. Rep. of Germany

[73] Assignee: Irvin Industries, Inc., Greenwich, Conn.

[21] Appl. No.: 745,217

[22] Filed: Nov. 26, 1976

[30] Foreign Application Priority Data

Dec. 3, 1975 [SE] Sweden .................. 7513642
Dec. 3, 1975 [SE] Sweden .................. 7513643

[51] Int. Cl.² .................. A62B 35/02; B65H 75/48
[52] U.S. Cl. .................. 242/107.4 A; 242/107.4 C
[58] Field of Search .................. 242/107.4 R–107.4 E; 297/388; 280/744–747

[56] References Cited

U.S. PATENT DOCUMENTS

| | | | |
|---|---|---|---|
| 3,100,669 | 8/1963 | Monroe | 242/107.4 B X |
| 3,384,415 | 5/1968 | Monroe | 242/107.4 B X |
| 3,467,337 | 9/1969 | Putman | 242/107.4 B |
| 3,659,800 | 5/1972 | Meyer | 242/107.4 C X |
| 3,838,832 | 10/1974 | Romanzi | 242/107.4 A |
| 3,851,837 | 12/1974 | Griffin | 242/107.4 A |
| 3,876,164 | 4/1975 | Dully | 242/107.4 A |
| 3,918,658 | 11/1975 | Beller | 242/107.4 A |

Primary Examiner—Harvey C. Hornsby
Assistant Examiner—John M. Jillions
Attorney, Agent, or Firm—Shlesinger, Fitzsimmons & Shlesinger

[57] ABSTRACT

A variety of belt locking mechanisms are disclosed, each utilizing a first mechanism responsive to sudden tensioning in the belt to lock it against further withdrawal, and a second involving a pendulum mechanism responsive to sudden changes in vehicle speed to lock the belt. Each belt tensioning device includes a reciprocable pin or shaft reponsive to increased belt tension to shift in a direction in which it causes a locking lever to engage lockingly with the teeth on a cogwheel which rotates with the spindle on which the belt is wound. The locking lever may be held against the resistance of a spring in its released position by a pendulum-type mechanism which moves in response to sudden changes in vehicle speed to release and allow the latch to pivot to its locking position. Alternatively, the motion-responsive pendulum or mechanism, or a similar mechanism, will operate a second cogwheel frictionally coupled to the first-mentioned cogwheel, to increase belt tension and lock the belt through the belt-tensioning device proper.

12 Claims, 14 Drawing Figures

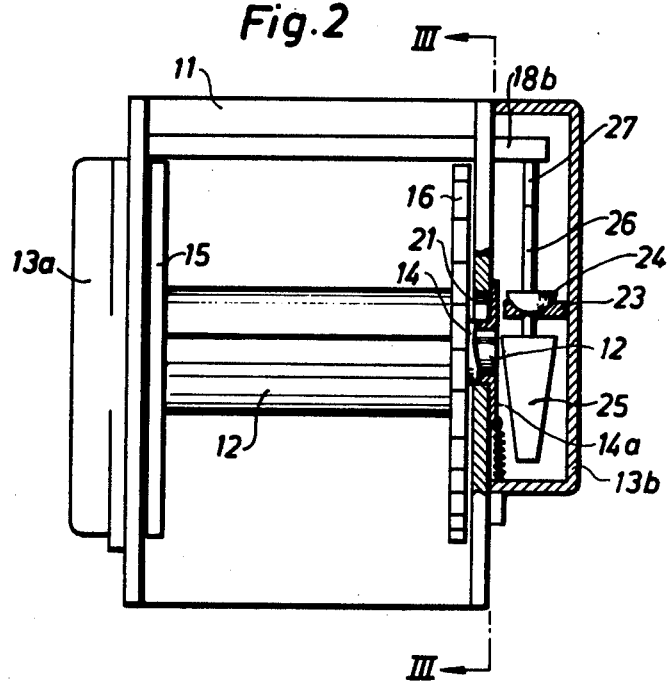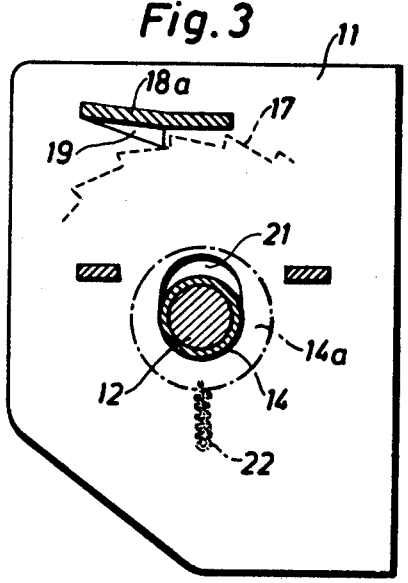

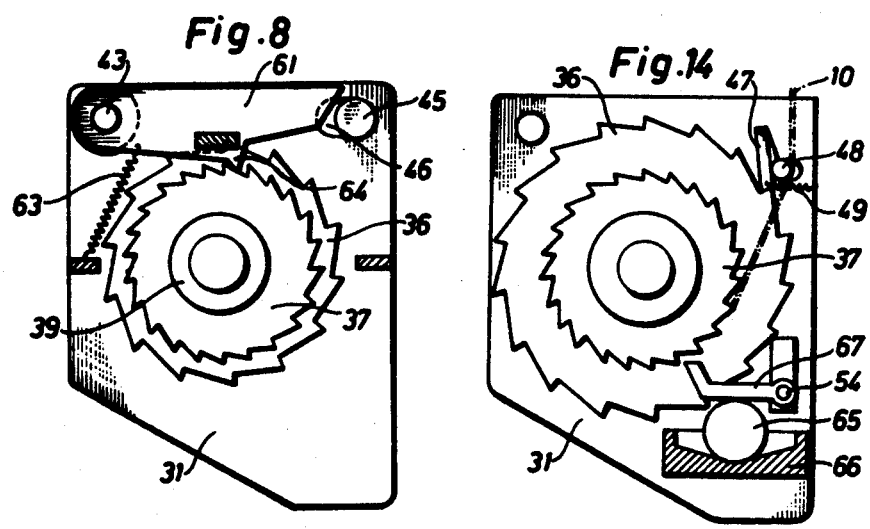
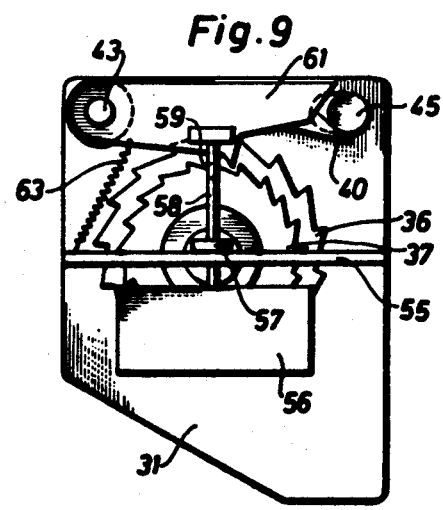
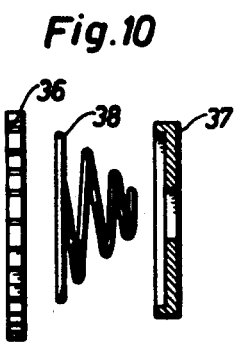

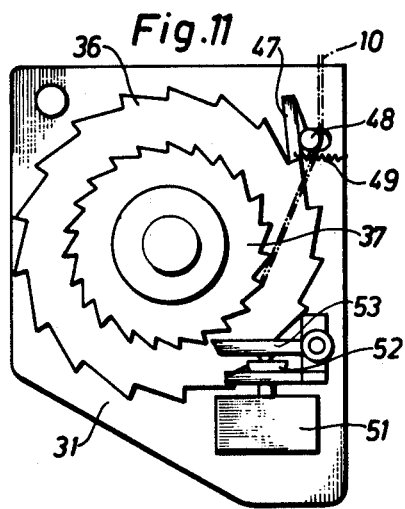
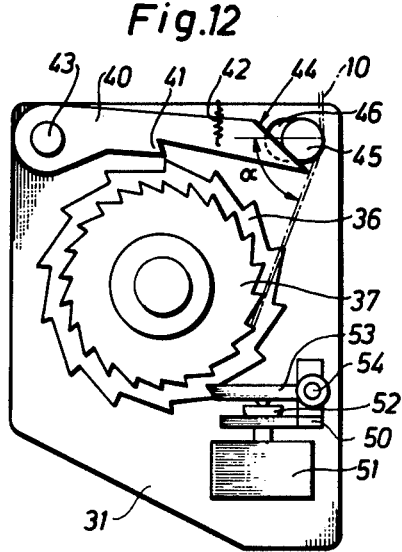
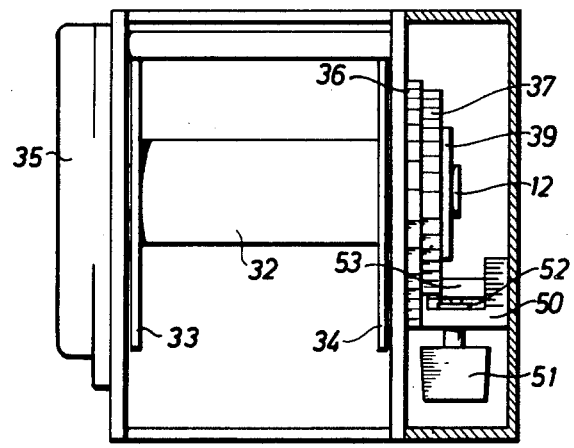

DEVICE FOR USE IN EMERGENCY LOCKING MECHANISM FOR WEBBING-TYPE SAFETY BELTS

In emergency locking retractors for webbing-type vehicle safety belts, it is known that a locking mechanism is activated by two essentially independent parts, namely one which reacts to the webbing ("webbing-triggered part") and one which reacts to the vehicle ("vehicle-triggered part"). The webbing-triggered part is arranged to activate the locking mechanism, or cause it to engage, when the tension in the webbing exceeds a pre-set value, as when the webbing is accelerated rapidly. The vehicle-triggered part, on the other hand, is arranged to activate the locking mechanism in the event of a change in the direction or speed of the vehicle exceeding a given acceleration (as measured in g).

The webbing-triggered locking function is often achieved by means of cams or couplings which rotate with the webbing retractor spindle as long as the webbing is withdrawn normally, but which when the retractor spindle accelerates, due to the increase in the tension of the webbing, rotate relative to the spindle and cause locking elements to engage with a cogwheel mounted on the retractor spindle, thus locking the latter and preventing it from rotating any further. The known mechanisms for this purpose are often complicated and contain numerous small components which require high precision in manufacture and also when adjusting the retracting locking function.

The vehicle-triggered part generally consists of a mechanism containing an inertia element, such as a pendulum, ball, etc., which normally occupies a neutral position, but which is displaced from this neutral position and thereby causes engagement of the locking mechanism when the direction or speed of the vehicle undergoes a sudden change. This can be brought about e.g. by a locking arm which engages directly or indirectly with the locking mechanism when actuated by the movement of the inertia element. A drawback of this vehicle-triggered locking mechanism is that the locking arm follows the oscillating or rolling motion of the inertia element and thus causes intermittent operation of the lock. Moreover, the sensitivity of this type of locking mechanism is such that great precision is required in its manufacture and adjustment.

The primary purpose of this invention is therefore to achieve a vehicle safety belt emergency locking mechanism in which the webbing-triggered and vehicle-triggered parts are combined so as to constitute a simple, reliable mechanism activated by the interaction of both parts so that certain advantages are secured.

Under the terms of the invention, this is achieved essentially in that the webbing-triggered part, in a manner known per se, consists of a locking element which is activated directly or indirectly by webbing tension and which causes the locking mechanism to engage when the webbing tension increases; in addition to which, when the vehicle changes speed or direction suddenly, a vehicle-triggered part brakes the spindle on which the webbing is stored, thus increasing the webbing tension and hence bringing the webbing-triggered part into action.

In a development of the invention, the vehicle-triggered part is preferably of the type in which a spring-loaded operating element bears on an inertia element, or on a part interacting with the latter, which is displaced from a neutral position by sudden changes in vehicle speed or direction in such a way that the operating element can assume a locking position in which the spindle is locked; as well as taking over the locking of the spindle via the locking mechanism, the webbing-triggered part of the mechanism also returns the operating element, against the spring-loading, into a position such that the inertia element — other circumstances permitting — can return to its neutral position.

Yet another purpose is to simplify the manufacture of the locking mechanism and also that of individual components, enabling for example the use of punched instead of diecast components.

In the following paragraphs, the invention will be more closely described in connection with the accompanying drawings.

FIG. 2 shows a longitudinal section through the locking mechanism of FIG. 1.

FIG. 3 shows a section on the line III—III in FIG. 2.

FIG. 8 shows a section on the line VIII—VIII in FIG. 6.

FIG. 9 shows a section on the line IX—IX in FIG. 6.

FIG. 10 is an exploded diagram of the cogwheel arrangement in the emergency locking mechanism of FIG. 6 or 7.

FIG. 11 is a side view of an emergency locking mechanism in another embodiment of the invention.

FIGS. 12 and 13 show a side view and a longitudinal view of yet another embodiment.

FIG. 14 is a side view of a ball mechanism.

Figure 1:
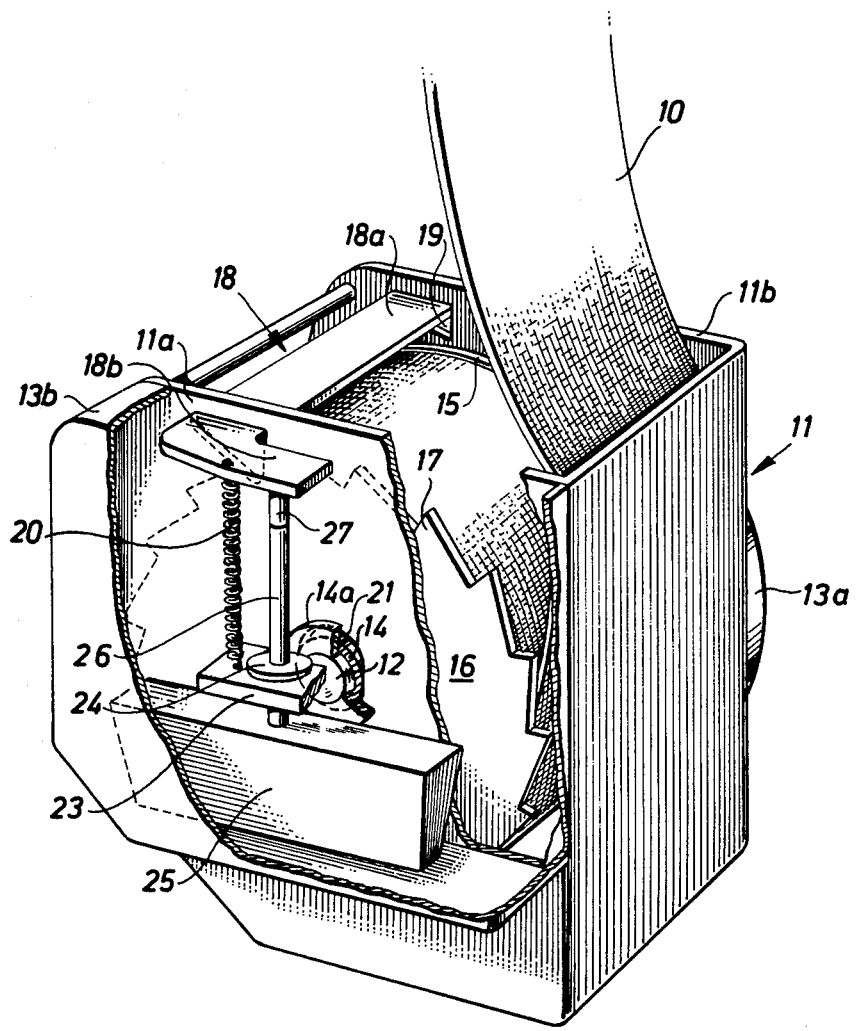
FIG. 1 is a perspective drawing of an emergency locking mechanism in accordance with the terms of the invention, viewed from the side at which the pendulum arrangement is located.

In the drawing, in particular FIG. 1, 11 denotes the casting of an emergency locking mechanism for a safety belt 10. The casing consists of a U-shaped element, the members of the U constituting the sides of the casing, which during use are provided with protective housings 13a, 13b, which protect the mechanism. Inside the U, between the sides, a spindle 12 is supported, on which the safety belt, normally consisting of a webbing strap 10, can be reeled. Retraction is brought about in a manner known per se by a coil spring acting on the spindle 12 and located on the outside of one side or member of the U-shaped casing 11. In the embodiment illustrated, the coil spring is covered by the housing 13a. The ends of the spindle 12 are supported in bushings 14 located in holes in the sides 11a, 11b of the casing 11. Fixed on the spindle inside the casing 11 and at a short distance from its sides are two flanges 15, 16, one of which, 16, in the illustrated embodiment is provided with cogs or teeth 17 and forms part of the locking mechanism. The latter also includes a lock lever 18, which in the illustrated embodiment is L-shaped, with one member 18a of the L running between the sides of the casing and supported in two triangular slots 19 in the said sides, while the other member 18b of the L is located outside one side and forms part of the pendulum arrangement, as will be described below. The locking lever 18 is springloaded towards the cogwheel 17 by a spring 20, but is normally prevented from engaging with the cogwheel by means of the pendulum arrangement, as will also be described in detail below.

The webbing-triggered locking is obtained by having the spindle 12 of the webbing reel and its bushings 14 supported in two elongated or oval holes 21 in the sides of the casing. To keep the bushings 14 in position, they are provided with a flange 14a which is shown on the drawing in FIGS. 1 to 3. A drawspring or drawsprings 22 connected to one or both bushing flanges normally retain the bushing, and hence the retractor spindle 12, in the slot in the lower part of the drawing.

Figure 4:
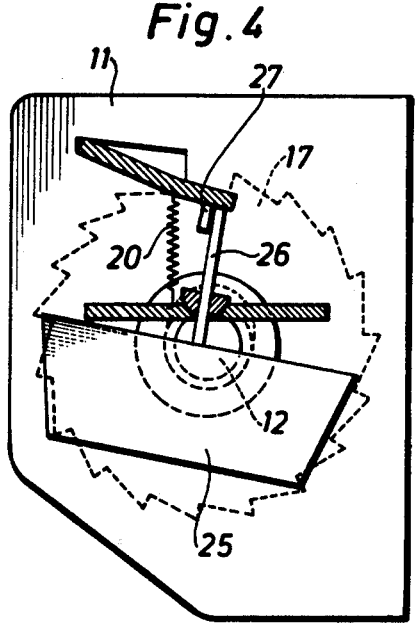
FIG. 4 shows a side view of the pendulum arrangement in operation.

The webbing-triggered locking described functions as follows: During normal withdrawal of the webbing 10, the spindle 12 rotates in the bushings 14 and the webbing can be reeled out without engaging the locking mechanism. When the tension in the webbing exceeds a given value, e.g. if the webbing is withdrawn violently by jerking etc., the spindle bushings 14 will be displaced upwards in the oval holes 21 against the tension of the springs 22, whereupon the cogs or teeth 17 of the flange ring 16 will engage with the lock lever 18 to stop the rotation of the reel (FIG. 4). When the webbing tension decreases, the spindle bushings 14 of the reel are drawn by the springs 22 back to the position of FIG. 1, and the teeth 17 disengage from the lock lever 18, after which the webbing can once again be reeled out.

The vehicle-triggered part in the embodiment illustrated includes a pendulum mechanism. On the right-hand (in the figure) side 11a of the casing is located a horizontal block 23 on or in which is positioned a bushing 24 which acts as a seat for a pendulum 25 suspended below the block 23. The pendulum 25 has a rod or shaft 26 which passes through the bushing 24 and is suspended in the bushing in such a way, e.g. by the cup-and-ball principle or similar principle, that the pendulum is free to oscillate in any direction. The rod 26 of the pendulum ends somewhat below that member 18b of the lock lever 18 which is located outside the casing, this member 18b being equipped with a short rod 27 positioned above the pendulum rod 26 and coaxial with the latter when the pendulum is in its neutral or vertical position. In this position, as can be seen from FIGS. 1 and 5, the rod 27 of the lock lever rests against the pendulum rod 26 with a preset loading force determined by the spring 20 attached to the lock lever 18.

The vehicle-triggered part described above functions as follows: When the pendulum is displaced in any direction, the pendulum rod 26 will swing aside, as shown in FIG. 4, and when the rod 27 of the lock lever 18 no longer has any surface to support it, the lock lever will be drawn downwards by the spring 20 to engage with the teeth 17 on the flange 16 of the reel. This locks the safety belt or webbing 10 and prevents it from being withdrawn any further.

Figure 5:
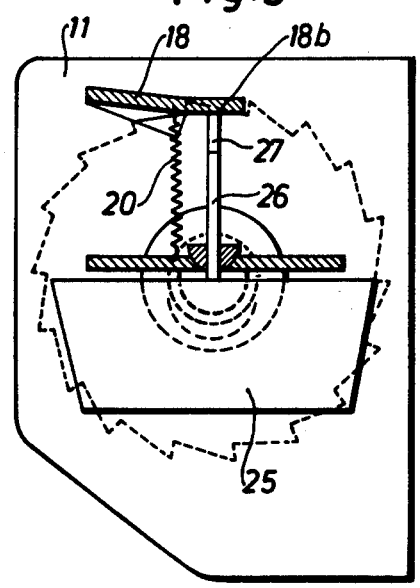
FIG. 5 shows the same view as FIG. 4 with the pendulum in neutral position.

When the webbing tension increases, the spindle bushings 14 are drawn upwards in the oval holes or slots 21 against the tension of the springs 22, i.e. the entire reel is lifted up in the slots 21 as described earlier in such a way that the cogs or teeth 17 of the flange 16, which are engaged with the lock lever 18, raise the latter as shown in FIG. 5. This raising of the lock lever 18 and hence of the rod 27 causes the locking function to be taken over by the webbing-triggered part, and the pendulum 25 is now free — other circumstances permitting — to return to its neutral or vertical position as shown in FIG. 5, since the rod 26 is once again free to swing into position beneath the rod 27. When the tension in the webbing ultimately eases, the retractor spindle is drawn by the springs 22 down to its normal position and the lock lever 18 disengages from the cogwheel 16, 17, since the lock lever 18 remains in its raised position due to the rod 27 bearing on the pendulum rod 26. If for any reason the pendulum 25 and pendulum rod 26 are still displaced but the tension in the webbing eases, the retractor spindle 12 and with it the toothed flange 16, 17 will drop, but at the same time the lock lever 18 will be drawn along by the action of the spring 20 inasmuch as the rod 27 of the lock lever is free to move downwards as shown in FIG. 4. If, on the other hand, the pendulum 25 returns to vertical position but the tension on the webbing continues to exceed the predetermined value, the reel will remain locked, since as long as the reel is in its raised position its toothed flange 16, 17 is engaged with the uplifted lock lever 18, as shown in FIG. 5. Thus, according to the invention, the webbing-triggered part of the emergency locking mechanism is used as the resetting mechanism for the vehicle-triggered part.

Figure 6:
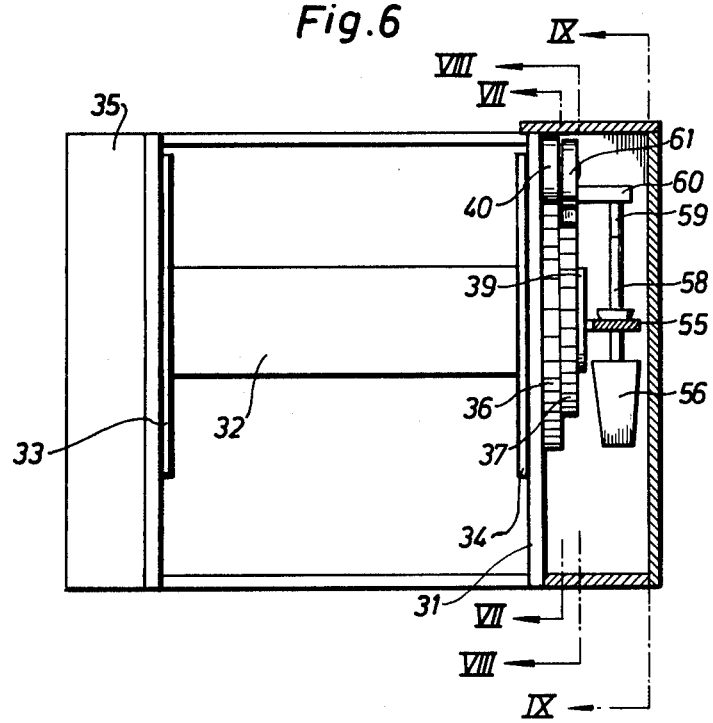
FIG. 6 shows a longitudinal section through an emergency locking mechanism in another embodiment of the invention.
Figure 7:
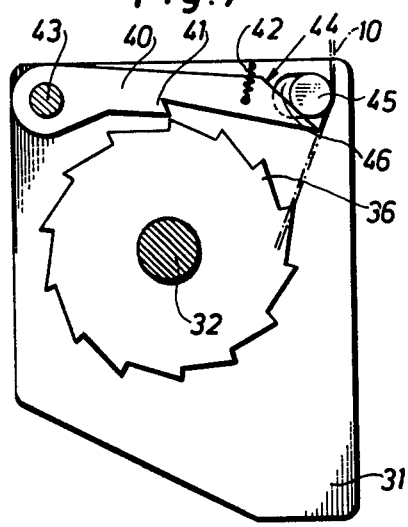
FIG. 7 shows a section on the line VII—VII in FIG. 6.

FIGS. 6 to 10 show a modified embodiment of the object of the invention. The casing 31, which is U-shaped in this embodiment too, contains the reel 32 with its flanges 33 and 34 in the customary manner. At the left of FIG. 6 is shown the housing 35, which conceals the coil spring for retracting the webbing 10. Outside the right-hand (in the figure) member 34 of the casing 31 the reel spindle 32 carries two cogwheels 36, 37, one of which, 36, is of larger diameter than the other, 37. The cogwheel 36 with the larger diameter is fixed on the spindle 32 so as to be unable to rotate with respect to the latter, and brings about the positive locking of the spindle when the locking mechanism comes into play. The smaller cogwheel 37 is partly or completely free to rotate on the spindle 32, and is held against the cogwheel 36 with a pressure such as to bring about a predetermined degree of friction between these two components. A spring 38 (FIG. 10) mounted between the cogwheels 36 and 37 brings about the desired friction. The cogwheels 36, 37 are locked laterally on the spindle 32 by means of a lock washer 39 or similar device. Alongside of and in the same plane as the larger cogwheel 36 is a catch 40 which has a tooth-like projection 41 located so as to engage, in one position of oscillation of the catch 40, with the teeth of the cogwheel 36 and which, in another position towards which it is drawn by a spring 42, is located with its projection clear of the path of the cogwheel 36 (FIG. 7). The catch 40 is able to oscillate about a pin 43, and at the end opposite the pin 43 it has a chamfer 44 bearing on a shaft or pin 45 which is slidably supported in an elongated slot 46. The webbing 10 reeled on the retractor spindle 46 is arranged so that as it leaves the casing it passes over and bears on the pin 45 at such an angle that the pin 45 is subjected to a component of the tension in the webbing 10.

The pendulum 56 is suspended in a bushing 57 on a plate 55 located inside the casing 31 on the same side as and outside of the cogwheels 36, 37. The pendulum has a rod 58 upon which bears a rod 59 attached to a projection 60 on a catch 61, which is preferably mounted on the same pin 43 as the catch 40. The catch 61 has a chamfer 62 lying in the path of the sliding pin 45. A spring 63 loads the catch 61 in a downward direction. When the pendulum 56 is displaced in any direction, the rod 58 moves out of its illustrated neutral position and the catch 61 is drawn downwards by the spring 63 so that a locking pawl 64 on the catch 61 engages with and locks the cogwheel 37. The locking of the cogwheel 37 has a braking effect on cogwheel 36, on which cogwheel 37 bears with friction, and the increase in webbing tension thus produced triggers locking of the webbing, in which process the catch 40 is depressed by the pin 45 as the latter slides under the influence of the webbing tension so that the projection 41 engages with the cogwheel 36 and locks the retractor spindle 32. While the pin 45 depresses the catch 40 by bearing on the chamfer 44, the catch 61 is raised by the same pin 45 bearing on the chamfer 62. The purpose of this action is to enable the pendulum 56, if the vehicle is no longer subject to the preset acceleration force, to return to its neutral position with the rod 59 of the catch 61 located above and bearing on the pendulum rod 58. If the vehicle is still subject to acceleration but the tension on the webbing has eased, the pressure on the pin 45 eases and the latter shifts to the right (in FIGS. 7 to 9), and at the same time the catch 40 is raised by the spring 42. As this takes place, the projection 41 is disengaged from the cogwheel 36, but the catch 61 remains in its depressed position so that the cogwheel 37 is locked by the projection 64. On the other hand, if the acceleration has ceased, so that the pendulum is in its neutral position, the catch 61 will remain raised, since its rod 59 is then bearing on the pendulum rod 58.

The illustrated design has important advantages. Inasmuch as the cogwheels 36 and 37 are capable of rotating to some extent with respect to each other against the spring-loading or friction force between them, the mechanism incorporates a means of aligning the engagement between the locking catch 40 and the cogwheel 36, which is of value because these parts are not always aligned with each other at the moment when locking is to take place. Hence, due to this alignment being possible between cogwheel 36 and cogwheel 37, there is no need for precision in the manufacture of these parts, but the cogwheels 36 and 37 can rotate somewhat with respect to each other before the locking catch 40 engages with cogwheel 36. The cogwheel 37 which brings about the definitive locking of the retractor spindle 32 should preferably be of metal, while the cogwheel 37, the locking of which merely initiates the locking mechanism, may be made of plastic or other inexpensive material.

The illustrated webbing-triggered locking can also be designed in another way, as shown in FIG. 11. In this embodiment, the locking catch 47 is given the form of a plate supported in triangular slots in the sides of the casing 31 in a similar way to the embodiment shown in FIGS. 1 to 5. The plate is provided or formed with a rounded part 48 over which the webbing passes as it leaves the reel 32. The lock lever 47, which is spring-loaded by means of a spring 49 away from engagement with the cogwheel 36, is positioned so that when depressed through an increase in webbing tension it engages directly with the teeth of the cogwheel 36 and stops the latter and hence the retractor spindle 32.

This webbing-triggered locking mechanism also interacts with a vehicle-triggered part of pendulum type, including a plate which is anchored in one side of the casing and supports, in a bushing 52 in the plate 50, a pendulum 51 which is free to be displaced in any direction. Surmounting the pendulum and actuated by its displacement is a lever 53, which is supported in the casing at 54. When the pendulum is displaced in any direction, the lever 53 is raised and engages with the cogwheel 37, whereby the spindle 32 of the retractor is braked, resulting in an increase in webbing tension which activates the webbing-triggered locking mechanism, i.e. the catch 47.

This action of the mechanism described is very important, because it makes it possible to reduce the dimensions of the vehicle-triggered part, i.e. the pendulum mechanism, since the latter is used only to brake the rotation of the retractor spindle sufficiently to initiate locking and raise the webbing tension to the predetermined value at which the webbing-triggered locking mechanism comes into action.

In the embodiment illustrated in FIGS. 12 and 13, the webbing-triggered locking of FIGS. 6 to 10 is combined with a vehicle-triggered part such as illustrated in FIG. 11. When the pendulum 51 locks or brakes the cogwheel 37 via the lever 53, the webbing tension increases so that the webbing-triggered locking mechanism involving the catch 40 is activated as described in connection with FIGS. 6 to 10.

In the particularly satisfactory embodiment shown in FIGS. 11, 12, and 13, the pin 45 or 48 subject to the webbing tension is positioned in such a way that, given a constant tensile stress in the webbing, the component of the webbing tension acting on the pin 45 increases with the length of webbing withdrawn. In the embodiment shown in FIGS. 11 and 12, this is achieved by having the webbing pass over the webbing-sensing element 45 or 47 at an angle of deflection whose complement is denoted by $\alpha$ in FIG. 12. As the webbing is withdrawn, the angle $\alpha$ will decrease. Hence, in the first stages of withdrawal of the webbing from the reel, the element 45, 47 has not the same tendency to react to the webbing tension as it has after withdrawal of the length of webbing normally required to secure a person in the seat belt assembly. This makes the use of the seat belt more convenient for the wearer, since rapid withdrawal of the webbing does not cause needless activation of the emergency locking mechanism, which is usual in existing designs where the webbing-triggered locking is dependent on the acceleration of the reel.

The new system according to the invention described above offers considerable advantages. The simple design gives high reliability and makes it possible to use robust lock components which are simple and inexpensive to produce. For example, the cogwheel 16, 17, and 36 can be positioned on the retractor spindle and made of punched sheet-metal. The new mechanism simplifies not only the production of the lock but also its adjustment. Since great freedom is allowable in the shape of the pendulum, e.g. the mechanism shown in FIGS. 11 and 12, it is also possible to use short pendulums, and this permits oblique positioning of the emergency locking mechanism and its casing. Inasmuch as in some embodiments the contact between the pendulum and the lock lever is broken, the lock lever can be it lowered to afford a well-defined locking position with no risk of flutter in the locking mechanism. This also eliminates the rattle and noise that could occur in pendulum locking of earlier known types.

In the embodiment shown in FIG. 14, the pendulum mechanism of FIG. 11 is replaced with an inertia element in the form of a sphere or ball. The ball 65 is located in the cup-shaped container 66, which is fixed in the casing and whose bottom slopes down towards its centre point so that the ball tends to assume a rest position in the centre of the container. The lower surface of the locking lever arm 67 rests upon the top of the ball. Rapid changes of speed will cause the ball 65 to move, by inertia, out of its rest position in the direction in question and up the sloping bottom of the container, thereby lifting the arm 67 to engage with the cogwheel 37. When the latter is braked, the webbing-triggered part 47 is activated and takes over the locking function as described in connection with previous embodiments.

The invention is naturally not restricted to the specific embodiments described above, but can be varied in the widest sense within the terms of the underlying concept.

I claim:

1. A device for use in emergency locking of webbing-type vehicle safety belts, comprising
   a frame adapted to be mounted on a vehicle,
   a spindle rotatable on said frame and having a webbing-type belt wound thereon,
   a locking mechanism on said frame operable to stop rotation of said spindle in a belt-withdrawing direction,
   a tension sensing element on said frame movable in response to a predetermined increase in the tension of said belt from a sensing position to a lock operating position where it causes said locking mechanism to operate,
   a vehicle-triggered member on said frame responsive to sudden changes in the speed or direction of said vehicle to move from a neutral position to an operative position in which it operates during withdrawal of said belt to effect said predetermined increase in the tension in said belt and to cause said tension sensing element to be moved to its lock operating position,
   a spring urging said vehicle-triggered member from its neutral position toward its operative position, and
   means including an inertia element releasably holding said vehicle-triggered member in its neutral position, and responsive to sudden changes in the speed or direction of said vehicle to release said member,
   said tension sensing element being operative, when moved to its lock operating position by release of said vehicle-triggered member from its neutral position, automatically to return said vehicle-triggered member to its neutral position.

2. A device as defined in claim 1, wherein said element comprises said spindle, and said locking mechanism includes a toothed ratchet wheel fixed to said spindle for rotation therewith, and a lock lever mounted on said frame for engagement with the teeth of said ratchet wheel, when said spindle is moved from its sensing to its lock operating position, thereby to lock said spindle against rotation in said belt-withdrawing direction.

3. A device as defined in claim 1, wherein said locking mechanism includes a locking part movable on said frame into and out of an operative position in which it prevents withdrawal of said belt, and said tension sensing element comprises a cylindrical member slidably supported in elongated slots in said frame and positioned to engage and move said locking part to its operative position upon movement of said cylindrical member from its sensing to its lock operating position.

4. A device as defined in claim 3, wherein said locking mechanism further comprises a cogwheel fixed to said spindle for rotation therewith, said locking part has thereon a projection releasably engageable with said cogwheel, when said locking mechanism is in operation, and said locking part has thereon a chamfered surface engageable by said cylindrical member upon movement of the latter to its lock operating position, whereby engagement of said cylindrical member with the chamfered surface on said locking part causes said part to be moved in a direction in which the projection thereon engages said cogwheel.

5. A device as defined in claim 1, wherein said locking mechanism includes a cogwheel secured to said spindle, and said tension sensing element comprises a lever supported intermediate its ends in triangular openings in said frame to be pivotal about one edge thereof into and out of an operative position in which the other edge of said lever is releasably engaged with said cogwheel to stop rotation of said spindle in said belt-withdrawing direction.

6. A device as defined in claim 1, wherein said tension sensing element has thereon a belt-guiding surface spaced from and extending parallel to the axis of rotation of said spindle, and slidably engaged with said belt to guide the belt during the withdrawal and retraction thereof at an angle of deflection whose complement decreases as the belt is withdrawn from said spindle.

7. A device as defined in claim 1, wherein said vehicle-triggered member has thereon a rod engaged with, and releasably supported by said inertia element, said inertia element being movable out from supporting engagement with said rod in response to sudden changes in the speed or direction of said vehicle, thereby to release said member for movement to its operative position.

8. A device as defined in claim 2 wherein said lock lever is supported intermediate its ends in registering triangular openings in said frame for pivotal movement about one edge thereof between a first position in which said lever is spaced from the teeth of said ratchet wheel, and a second position wherein said lever is engaged with one of the teeth of said wheel, said lever is generally L-shaped in configuration, and a rod projects from a portion of said lever and is releasably supported by said inertia element normally to maintain said lever in its first position.

9. A device as defined in claim 8 wherein said inertia element comprises a relatively large, plate-shaped pendulum supported for oscillation in a ring-shaped mounting on said frame, and having thereon a rod which is releasably engageable with the rod which projects from said lock lever.

10. A device as defined in claim 1, wherein said locking mechanism comprises a pair of cogwheels mounted coaxially of said spindle, one of said cogwheels is fixed to the spindle for rotation therewith, a friction coupling releasably connects the other of said cogwheels to said one cogwheel for transmitting the rotation of said other cogwheel to said one cogwheel, said vehicle-triggered member comprises a first locking element mounted adjacent said other cogwheel and operative upon release of said vehicle-triggered member releasably to engage said other cogwheel to brake the rotation of said other cogwheel, and said one cogwheel which is coupled thereto, a second locking element is mounted adjacent said one cogwheel for releasable engagement therewith, and said tension sensing element is operative, upon the braking of said cogwheels and the consequent increase in the tension of said belt, to move to its lock operating position in which it engages and urges said second locking element into braking engagement with said one cogwheel.

11. A device as defined in claim 10, wherein said second locking element has thereon a chamfered surface upon which said tension sensing element bears in a direction such that said second locking element is urged into locking engagement with said one cogwheel.

12. A device as defined in claim 11, wherein said first locking element has thereon a chamfered surface engageable by the webbing-sensing element to be urged thereby in a direction away from said other cogwheel thereby to disengage said first locking element from said other cogwheel.

* * * * *